(12) United States Patent
Gupta et al.

(10) Patent No.: US 8,962,774 B2
(45) Date of Patent: Feb. 24, 2015

(54) ATTRITION RESISTANT CATALYST SYSTEM FOR MANUFACTURE OF POLYOLEFINS

(75) Inventors: Virendrakumar Gupta, Navi Mumbai (IN); Saurabh Singh, Gujarat (IN); Jomichan Joseph, Gujarat (IN); Kamlesh J. Singala, Gujarat (IN); Bhavesh K. Desai, Gujarat (IN)

(73) Assignee: Reliance Industries Limited, Maharashtra (IN)

( * ) Notice: Subject to any disclaimer, the term of this patent is extended or adjusted under 35 U.S.C. 154(b) by 0 days.

(21) Appl. No.: 13/808,761

(22) PCT Filed: Jul. 11, 2011

(86) PCT No.: PCT/IN2011/000460
§ 371 (c)(1),
(2), (4) Date: Feb. 26, 2013

(87) PCT Pub. No.: WO2012/007963
PCT Pub. Date: Jan. 19, 2012

(65) Prior Publication Data
US 2013/0211022 A1    Aug. 15, 2013

(30) Foreign Application Priority Data
Jul. 12, 2010    (IN) .......................... 1981/MUM/2010

(51) Int. Cl.
*C08F 4/10*    (2006.01)
*C08F 10/00*    (2006.01)
*C08F 110/02*    (2006.01)
*C08F 110/06*    (2006.01)

(52) U.S. Cl.
CPC . *C08F 4/10* (2013.01); *C08F 10/00* (2013.01); *C08F 110/02* (2013.01); *C08F 110/06* (2013.01)
USPC .......... 526/124.1; 502/111; 502/104; 502/118

(58) Field of Classification Search
CPC ..................................... C08F 4/10; C08F 4/50
USPC ........................ 526/124.1; 502/111, 104, 118
See application file for complete search history.

(56) References Cited

FOREIGN PATENT DOCUMENTS

| EP | 0461268 A1 | 12/1991 |
| EP | 0544006 A1 | 6/1993 |
| EP | 0544919 A1 | 9/1993 |
| WO | WO 2009130707 A2 * | 10/2009 |

* cited by examiner

*Primary Examiner* — Ling Choi
*Assistant Examiner* — Catherine S Branch
(74) *Attorney, Agent, or Firm* — Ladas & Parry LLP

(57) ABSTRACT

Regular shaped magnesium particles containing attrition resistant precursors and procatalysts thereof and processes for their synthesis and their use in the manufacture of polyolefins are described. A process for the synthesis of precursor particles which give highly active and improved surface area procatalysts for producing high bulk density polyolefin resins containing low fines and capable of incorporating high rubber content are described. A process for the synthesis of an attrition resistant precursors to prepare an attrition resistant Zeigler Natta procatalysts synthesized by using the precursors and to the polyolefin resin synthesized using the procatalysts is also described.

15 Claims, 4 Drawing Sheets

SEM image of precursor prepared in Example 1

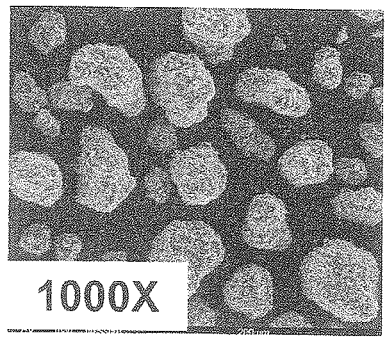
Fig. 1: SEM image of precursor prepared in Example 1
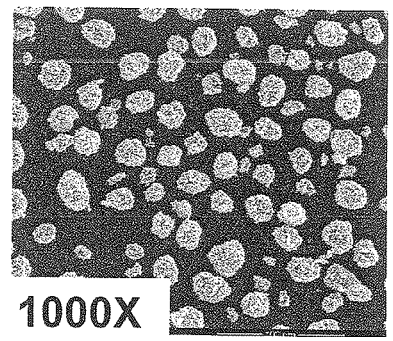
Fig. 2: SEM image of precursor prepared in Example 2 (Attrition resistant precursor prepared using lower particle size magnesium)
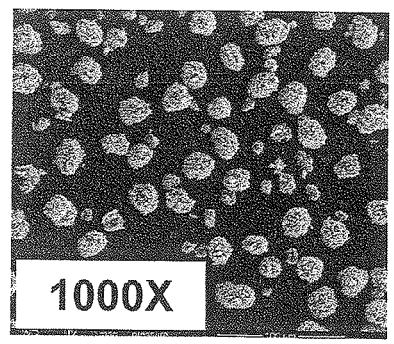
Fig. 3: SEM image of precursor prepared in Example 3 (Attrition resistant precursor prepared by imparting high power consumption per unit volume of reaction mass)

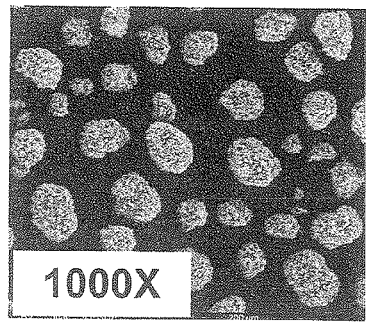
Fig. 4: SEM image of precursor prepared in Example 4 (Reduced particle size precursor prepared through fast heating of reaction mass)
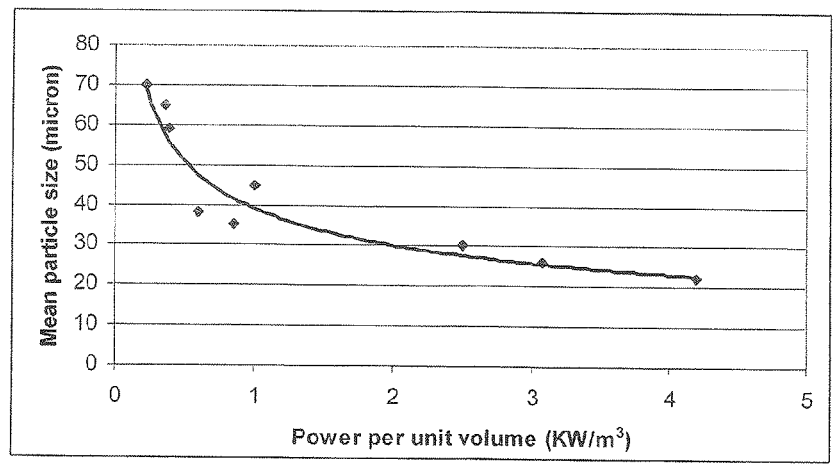
Fig. 5: Plot of power consumption per unit volume vs. precursor mean particle size
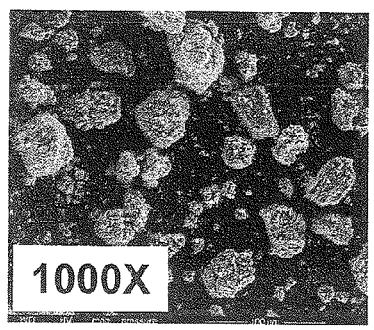
Fig. 6: SEM image of catalyst prepared in Example c.1

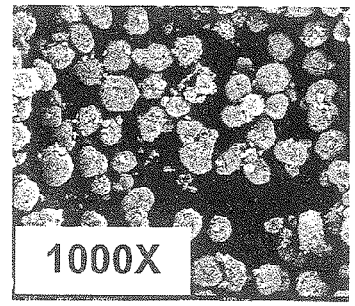
Fig. 7: SEM image of catalyst prepared in Example c.2 (Attrition resistant catalyst prepared using attrition resistant precursor of Example 2)
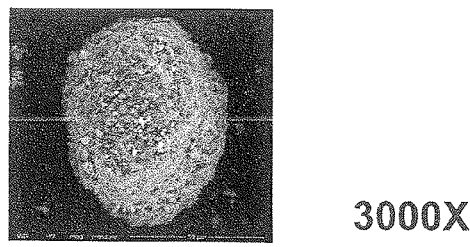
Fig 8: Catalyst prepared from magnesium alkoxide based precursor of Example c.4
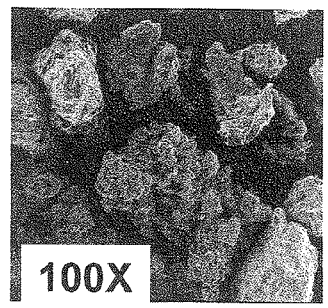
Fig. 9: SEM image of polymer prepared in Example p.1

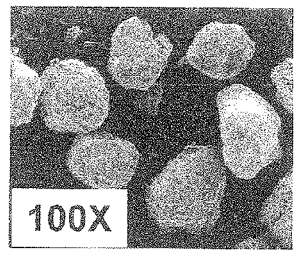
Fig. 10: SEM image of polymer prepared using attrition resistant catalyst of Example c.2
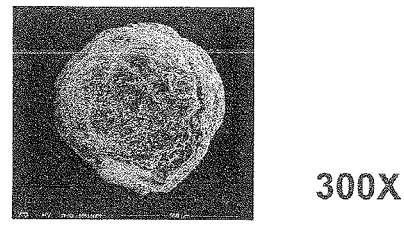
Fig 11: Polypropylene Resin obtained in Example 4 using magnesium alkoxide based catalyst of Example c.4

ATTRITION RESISTANT CATALYST SYSTEM FOR MANUFACTURE OF POLYOLEFINS

RELATED APPLICATION INFORMATION

This application is a 371 of International Application PCT/IN2011/000460 filed 11 Jul. 2011 entitled "Attrition Resistant Catalyst System For Manufacture Of Polyolefins", which was published in the English language on 19 Jan. 2012, with International Publication Number WO 2012/007963 A2 and which claims priority from Indian Patent Application 1981/MUM/2010, filed 12 Jul. 2010, the content of which is incorporated herein by reference.

FIELD OF INVENTION

The present invention relates to regular shaped magnesium particles containing attrition resistant precursor and procatalyst thereof and processes for their synthesis and their use in the manufacture of polyolefins. More particularly, the present invention relates to a process for the synthesis of a said precursor particles which give a highly active and improved surface area procatalyst for producing high bulk density polyolefin resins containing low fines and capable of incorporating high rubber content. In particular, the present invention relates to a process for the synthesis of an attrition resistant precursor to prepare an attrition resistant Zeigler Natta procatalyst synthesized by using the precursor and to the polyolefin resin synthesized using the said procatalyst.

BACKGROUND OF INVENTION

Resin particles with high bulk density are desirable for efficient plant operations and high throughput. Resin particles should also have regular shape and narrow particle size distribution for good flowability during resin extrusion. They are also essential to produce regular shaped copolymer products with uniform rubber dispersion. Shape regularity, size distribution and bulk density of polymer/polyolefin resin is usually related to the shape and size of the catalyst particles as well as of the solid reactants from which the catalyst particles are synthesized. Usually solid magnesium containing materials such as magnesium alkoxides and magnesium halides are used as precursors.

WO 2005/044873 discloses a method for synthesizing spherical magnesium alkoxide particles by reacting magnesium with an alcohol mixture at a temperature below the boiling point of the mixture. The end product obtained is a mixture of magnesium ethanolate, magnesium methanolate and magnesium isopropanolate. The spherical magnesium alkoxide particles synthesized by the method have lower mean particle diameter (<40 µm) and are fragile and do not retain their morphology or particle size during the synthesis of Ziegler Natta procatalyst, especially when the procatalyst synthesis is carried out on a plant scale using high attrition of process. Further, the resin produced using this method exhibits low resin bulk density which can hamper the plant throughput.

In another approach, magnesium halide alcoholate formed using magnesium dichloride and aliphatic alcohol can also be used as precursor for making solid catalyst comprising titanium compound such as titanium tetrahalide (U.S. Pat. No. 4,948,770).

US20080262178 A1 discloses spherical magnesium alcoholate precursor particles prepared using mixed alcohols in presence of halogen and/or an optionally organic halogen compound. Catalyst comprising such precursor is used for gas phase polymerization of polypropylene with low fines and higher bulk density. However in US20080262178 A1 the reaction temperature used for precursor preparation is below boiling point of alcohols, which results in longer batch time. The particle diameter obtained is preferably between 10 and 50 µm to retain the sphericity of catalyst. The gas phase polypropylene produced using the precursor catalyst has bulk density of 0.46 g/cc with low fines.

U.S. Pat. No. 4,663,299 A teaches a process for preparing spherical particles of a compound with the general formula $Mg(OR)_{2-a}(OR')_a$. In the process R is an alkyl group with from 2 to 8 carbon atoms, R' is an alkyl group with from 1 to 7 carbon atoms and 'a' is a number of from 0 to 0.5. The process comprises preparing a homogeneous solution of a compound $Mg(OR)_2$ in an aliphatic alcohol with the general formula R'OH, spray-drying the solution at a temperature of from 15° to 85° C., suspending the spray-dried solid particles in an aliphatic alcohol with the formula ROH in which R is the same alkyl group as present in the said compound $Mg(OR)_2$, heating the suspension in order to remove an alcohol with the formula R'OH from the liquid phase by distillation and separating the solid particles from the liquid phase. U.S. Pat. No. 4,663,299 A teaches magnesium alkoxide precursor using mixed alcohol (ethanol and methanol) involving spray drying and distilling off one alcohol during preparation. This is used to prepare a catalyst used to prepare polyolefins in high bulk density with lower fines. However, this results in having additional step of drying.

WO 2009/084799 A1 provides a method of preparation of dialkoxy magnesium that is used as a support for an olefin polymerization catalyst for polyolefin preparation. Specifically, it provides a method of preparation of a support for an olefin polymerization catalyst, which comprises preparation of dialkoxy magnesium by reacting magnesium metal with alcohol in the presence of a reaction initiator, wherein bromine is used as the reaction initiator so as to obtain spherical dialkoxy magnesium. Dialkoxy magnesium support of this document is prepared by continuous addition of magnesium and alcohol into the reactor; and bromine as initiator; resulting in low bulk density.

U.S. Pat. No. 5,223,466 A describes a process for making a magnesium-containing supported titanium-containing catalyst, alpha-olefin polymerization or co-polymerization catalyst or catalyst component having a large particle size, semi-spherical particle shape and high resistance to attrition, but precursor syntheses process employs dissolving and re-precipitation, which makes the process very expensive.

U.S. Pat. No. 4,300,649 describes a solid catalyst component (procatalyst) obtained by heating soluble magnesium compound such as magnesium chloride with an alcohol of at least 4 carbon atoms, in the presence of an ester to produce a solution which is added to titanium tetrachloride and an electron donor to form a solid catalyst. This approach can give good morphology under very stringent and controlled conditions but catalyst yield per unit mass of precursor consumption is low and the cost of catalyst production is very high.

In another variant as explained in U.S. Pat. No. 5,066,737, a complex-magnesium-containing and titanium-containing improved morphology of solid olefin polymerization procatalyst precursor is produced by reaction of magnesium alkoxide, titanium tetraalkoxide and a phenolic compound followed by removal of alkanol. Conversion of this solid to an olefin polymerization procatalyst and the procatalyst to an olefin polymerization catalyst results in a catalyst which is used to polymerize lower alpha-olefin monomers. The polymer product is obtained in good yield and has good properties including a relatively high bulk density and a relatively narrow particle size distribution. However, synthesis of this type of precursor is rather complicated and involves several steps. As the number of stages increase, the tendency of particle breakage due to mechanical attrition also increases.

None of the prior art discloses preparation of a catalyst system, which when used in commercial polymerization can yield resin particles with particle size >1 mm. If such resin, without fines, is directly produced from the reactor then additional extrusion is not required for converting resin to pallets post polymerization. It is a complex process to synthesize catalysts which maintain their sphericity with higher sized precursor particles because bigger precursor particles generate fines and broken particles, once they are put in high attrition catalyst synthesis process.

The above-mentioned prior art processes suffer from several drawbacks. In all these processes the precursor, procatalyst thereof and polyolefin resin produced do not have the desired particle characteristics, or are produced in a low yield or involve series of reaction stages. Therefore, there is a need to develop a process, which overcomes one or more of the above limitations. Precursors of different particle size are required to produce procatalysts of different particle size. The present invention provides an improved precursor and procatalyst thereof and efficient process for preparing them, which improves polyolefin resin production.

OBJECTS OF THE INVENTION

It is therefore, an important object of the present invention to provide a process for the synthesis of the said precursor in which it is possible to carefully control the particle size of the precursor during the procatalyst synthesis reaction.

It is another object of the invention to provide a novel magnesium containing attrition resistant precursor from magnesium metal granules.

It is another object of the invention to provide a procatalyst from the said precursor which can withstand attrition during polymerization process.

It is another object of the invention to provide a procatalyst from the said precursor for use in manufacture of polyolefin resin having high bulk density and low fines.

It is another object of the invention to provide a process for the synthesis of a said precursor particles which give a highly active and improved surface area Ziegler Natta (Z-N) procatalyst for producing high bulk density polyolefin resins containing low fines.

It is another object of the invention to provide a process for the synthesis of a precursor particles and procatalyst thereof for use in polyolefin manufacture in which it is possible to achieve better control over precursor particle size by either using smaller sized magnesium as starting material or by varying the magnesium metal granule size or by altering the shear in the reaction mass by altering power consumption per unit volume of reaction mass or suitable combination of both or by altering the reaction temperature.

It is another object of the invention to provide a process for the synthesis of precursor and procatalyst thereof with high surface area and resulting in narrow particle size distribution with uniform shape.

It is yet another object of the invention to provide a process for the synthesis of a procatalyst for use in polyolefin manufacture with minimal fines generation and in which morphology of the catalyst is retained throughout the process.

It is yet another object of the invention to provide a process for the synthesis of a precursor and procatalyst thereof in which their particle sizes can be varied as per specific requirement.

It is yet another object of the invention to provide a process for the synthesis of a precursor and procatalyst thereof, wherein the said precursor retains its shape and size throughout the procatalyst preparation and polymerization processes.

It is yet another object of the invention to provide a process to further increase the precursor surface area by pretreatment of magnesium containing precursor with titanium tetrachloride diluted with a solvent.

It is another object of the invention to provide a process for the manufacture of low fine content polyolefins comprising subjecting olefins to polymerization in the presence of the said procatalyst.

It is yet another object of the invention to provide a process for the manufacture of low fine content polyolefins comprising subjecting olefins to polymerization in the presence of the said procatalyst by an extruder less reactor granule technology.

SUMMARY OF THE INVENTION

The above and other objects of the present invention are achieved by regular shaped magnesium containing precursor particles which give highly active with improved surface area and attrition resistant supported procatalyst for producing high bulk density polyolefin resin containing low fines.

The invention also relates to a method for synthesis of the attrition resistant precursor, to Ziegler Natta procatalyst synthesized by using the precursor and to polymerization of olefins using the procatalyst to produce polymer resins. Precursor disclosed in the invention can be modified through a pretreatment step for improving the catalyst surface area.

The invention relates to a method for synthesis of attrition resistant magnesium based spherical precursor which gives highly active and improved surface area attrition resistant supported procatalyst for producing high bulk density polyolefin resin containing low fines.

The invention also relates to a method for synthesis of the attrition resistant precursor, to Ziegler Natta procatalyst synthesized by using the precursor and to the polymer resin synthesized using the procatalyst by an extrusion less polymerization producing polyolefins having particle size greater than 1 mm diameter.

The present invention also relates to a method for synthesis of the attrition resistant precursor. The process comprises reacting magnesium metal granules with a mixture of alcohols in the presence of iodine by maintaining reaction temperature in the range of 40° C. to 90° C., preferably at 80° C. for a period of 6-12 hours and the vapours of the mixture produced during the reaction being condensed in an overhead condenser, hydrogen gas produced during the reaction being vented off and the mixture of alcohols left after the reaction being separated by decantation or filtration and reused. The reaction mixture of magnesium metal granules with a mixture of alcohols in the presence of iodine could be agitated at agitator speed of 100 to 1000 rpm (at a higher power consumption between 0.1 to 30 KW/m$^3$) after which the vapours of the mixture produced during the reaction are condensed in an overhead condenser, hydrogen gas produced during the reaction being vented off and the mixture of alcohols left after the reaction being separated by decantation or filtration and reused. The process of the present invention increases the bulk density and strength of precursor. At the same time different particle sizes of the precursor can be obtained while retaining its spherical morphology, (1) by using smaller size magnesium as starting material and (2) controlling the particle size by monitoring the agitator power consumption per unit volume of reaction mass (indirect measurement of shear in the reaction mass) while retaining its sphericity. By increase in power consumption per unit volume of reactor mass, the particle size of precursor can be reduced and sphericity is retained.

The particle size of the magnesium metal granules used is in the range of 50 micron to 1000 micron size, preferably 50-200 micron size.

The precursor particles are spheroidal having a mean particle diameter in the range of 15-75 microns.

In one embodiment, higher particle size precursor, of particle size greater than 50 microns, is obtained by reducing the power output of agitator to less than 0.4 KW/m$^3$. The particle size of the magnesium metal granules used in this embodiment is about 250 microns. However different combinations of magnesium particle size, agitator power, and catalyst quantity and temperature profile can be used to make precursor of high particle size.

The present invention also provides a process for the manufacture of a attrition resistant procatalyst by treating magnesium alkoxide based precursor with TiCl$_4$ in presence of a solvent in a ratio of 0.4 to 2.5 (TiCl$_4$ to solvent (v/v) ratio) with the reaction temperature at a range of from 20° C. to 150° C., optionally in presence of internal donor(s). The procatalyst obtained is attrition resistant having improved surface area. The present invention achieves a highly disordered precursor structure to give high activity procatalyst with regular shaped particles.

Preferably, said internal donor(s) are selected from one or more of methyl benzoate, ethyl benzoate, n-propyl benzoate, i-propyl benzoate, n-butyl benzoate, i-butyl benzoate, dimethyl phthalate, diethyl phthalate, dipropyl phthalate, di-isopropyl phthalate, di-butyl phthalate and di-isobutyl phthalate, other monoesters, diesters, succinates and diethers.

Preferably, said solvent is selected from aromatic or aliphatic hydrocarbon solvent, polar in nature and non reactive to MgCl$_2$ and TiCl$_4$. Examples of such solvents, but not limited to, are chlorobenzene, dichlorobenzene, trichlorobenzene, toluene, o-chlorotoluene, benzene, kerosene, decane, hexane, heptane, octane, nonane, cyclohexane etc.

In another embodiment the invention provides a process for preparing a attrition resistant procatalyst having increased precursor surface area using higher particle size precursor, of particle size greater than 50 microns, comprising treating said magnesium alkoxide based precursor with TiCl$_4$ in presence of a solvent in a mole ratio 5.0 to 20 (TiCl$_4$ to Mg ratio) and internal donor at a reaction temperature in the range of from 80° C. to 130° C. to obtain the procatalyst with improved surface area having regular shaped particles. The reaction between magnesium alkoxide based precursor and TiCl$_4$ is initiated between 20° C. to 40° C. which reduces the extended cooling and makes the process more economical.

The present invention also provides a process for the manufacture of low fine content polyolefins having high bulk density (0.30 to 0.50 gm/cc) comprising subjecting olefins to polymerization in the presence of a catalyst system comprising said procatalyst prepared by the process described above and an organo aluminium compound cocatalyst, preferably triethyl aluminium optionally along with a selectivity control agent. The procatalyst is used directly for manufacturing of polymer. The catalyst system includes procatalyst, cocatalyst and optionally a selectivity control agent which are simultaneously injected in the polymerization reactor.

The present invention also provides a process for the manufacture of low fine content polyolefins having high bulk density wherein the polymer is obtained using said catalyst system that excludes the step of extrusion post polymerization thus resulting in a extruder less reactor granule technology and the polymer resin is directly obtained from the reactor having particle size greater than 1 mm diameter.

The selectivity control agents are selected from esters of monocarboxylic acids and their substituents, alkoxy alkyl benzoates, alkoxy silanes and dialkoxy silanes.

Preferably, said olefin is propylene, and polymerization is carried out in gas phase.

BRIEF DESCRIPTION OF ACCOMPANYING DRAWINGS

FIG. 1 shows SEM image of precursor prepared in Example 1

FIG. 2 shows SEM image of precursor prepared in Example 2 (Attrition resistant precursor prepared using lower particle size magnesium)

FIG. 3 shows SEM image of precursor prepared in Example 3 (Attrition resistant precursor prepared by imparting high power consumption per unit volume of reaction mass)

FIG. 4 shows SEM image of precursor prepared in Example 4 (Reduced particle size precursor prepared through fast heating of reaction mass)

FIG. 5 shows plot of power consumption per unit volume vs. precursor mean particle size FIG. 6 shows SEM image of procatalyst prepared in Example c.1

FIG. 7 shows SEM image of procatalyst prepared in Example c.2 (Attrition resistant procatalyst prepared using attrition resistant precursor of Example 2)

FIG. 8 shows procatalyst prepared from magnesium alkoxide based precursor of Example c.4

FIG. 9 shows SEM image of polymer prepared in Example p. 1

FIG. 10 is a SEM image of polymer prepared using attrition resistant procatalyst of Example c.2

FIG. 11: Polypropylene Resin obtained in Example p. 4 using magnesium alkoxide based catalyst of Example c.4

DETAILED DESCRIPTION OF THE INVENTION

The invention provides magnesium containing attrition resistant precursor particles and procatalyst prepared thereof having uniform spherical shape and size.

The invention provides a process for synthesis of magnesium containing precursor particles which give procatalyst to produce high bulk density regular shaped resin particles. The precursor is synthesized by reaction of magnesium metal granules with a mixture of at least two alcohols and using a controlled reaction rate. Particle size of the magnesium containing precursor can be modified by changing rate of reaction. Rate of reaction can be changed by varying temperature for small changes in particle size and can be varied in higher degree by varying particle size of magnesium granules and by varying the agitator power consumption per unit volume of reaction mass.

The invention provides a process for the synthesis of magnesium containing regular shaped precursor particles having higher average particle size of 15-75 microns by reaction of alcohol mixture with magnesium metal granules of particles size 50-1000 microns. The process comprises reacting magnesium metal, in presence of iodine, with a mixture of alcohols, maintaining reaction temperature in the range of 40° C. to 90° C., preferably >80° C. for a period of 6-12 hours under agitation at agitator speed of 100 to 1000 rpm, at a higher power consumption between 0.1 to 30 KW/m$^3$, preferably 0.1 to 10 KW/m$^3$ after which the vapours of the mixture produced during the reaction are condensed in an overhead condenser, hydrogen gas produced during the reaction being vented off and the mixture of alcohols left after the reaction being separated by decantation or filtration and reused. The agitation is carried out at preferably 100-600 rpm at higher power consumption between 0.1 to 5 KW/m$^3$. In another embodiment, the invention provides a process for the synthesis of magnesium containing regular shaped precursor particles having lower average particle size 15-75 microns by reaction of alcohol mixture with magnesium granules of particle size ~50-200 microns. The process comprises reacting magnesium metal, in presence of iodine, with a mixture of alcohols, maintaining reaction temperature >80° C. for a period of 6-12 hours. In another embodiment, the invention provides a process for the synthesis of magnesium containing regular shaped precursor particles of greater than 50 microns particle diameter by reaction of alcohol mixture with magnesium granules of particles size ~250 microns and reducing the power output of agitator to less than 0.4 KW/m$^3$. The process comprises reacting magnesium metal, in presence of iodine, with a mixture of alcohols, maintaining reaction temperature in the range of 20° C. to 150° C., preferably 80° C. for a period of 6-12 hours. However different combinations of magnesium particle size, agitator power, and catalyst quantity and temperature profile can be used to make precursor of high particle size. In another embodiment particle size characteristics of the precursor are modified by changing shear in the reaction mass by changing power consumption per unit volume of reaction mass in the reactor. Magnesium metal of same particle size can be used under different reaction mass power consumption conditions to modify the resultant precursor size characteristics. The process comprises reacting magnesium metal, in presence of iodine, with a mixture of alcohols, maintaining reaction temperature in the range of 40° C. to 85° C., preferably >80° C. for a period of 6-12 hours. In another embodiment the power consumption per unit volume of reaction mass can be varied online during the reaction to make the particle size distribution narrow or broad. The process comprises reacting magnesium metal, in presence of iodine, with a mixture of alcohols, maintaining reaction temperature in the range of 40° C. to 85° C., preferably >80° C. for a period of 6-12 hours. In another embodiment the iodine catalyst is present in an initial concentration is 0.5 to 3.0 g/liter, preferably 0.75 to 2.0 g/liter. This can be changed to modify the particle size characteristics of the resultant precursor. The process comprises reacting magnesium metal, in presence of iodine, with a mixture of alcohols, maintaining reaction temperature in the range of 40° C. to 85° C., preferably >80° C. for a period of 6-12 hours. In another embodiment the precursor produced in above given processes are treated with small quantity of titanium tetrachloride in presence of a solvent at a temperature of 40-150° C. for improving the precursor surface area and achieving a highly disordered precursor structure to give high surface area procatalyst with regular shaped particles.

The present invention also provides a process for preparing an attrition resistant procatalyst having increased precursor surface area using said magnesium alkoxide based precursor comprising treating said magnesium alkoxide based precursor with TiCl$_4$ in presence of a solvent in a mole ratio 5.0 to 20 (TiCl$_4$ to Mg ratio) and internal donor at a reaction temperature in the range of from 80° C. to 150° C. to obtain the procatalyst with improved surface area having regular shaped particles. The internal donors are selected from the group consisting of one or more of methyl benzoate, ethyl benzoate, n-propyl benzoate, i-propyl benzoate, n-butyl benzoate, i-butyl benzoate, dimethyl phthalate, diethyl phthalate, dipropyl phthalate, di-isopropyl phthalate, di-butyl phthalate and di-isobutyl phthalate, other monoesters, diesters, succinates and diethers and the internal donors used are single or multiple. In another embodiment the invention provides a process for preparing a attrition resistant procatalyst having increased precursor surface area using said magnesium alkoxide based precursor with higher particle size of greater than 50 microns comprising treating said magnesium alkoxide based precursor with TiCl$_4$ in presence of a solvent in a mole ratio 5.0 to 20 (TiCl$_4$ to Mg ratio) and internal donor at a reaction temperature in the range of from 80° C. to 130° C. to obtain the procatalyst with improved surface area having regular shaped particles. The reaction between magnesium alkoxide based precursor and TiCl$_4$ is initiated between 20° C. to 40° C. which reduces the extended cooling and makes the process more economical. The internal donors are selected from the group consisting of one or more of methyl benzoate, ethyl benzoate, n-propyl benzoate, i-propyl benzoate, n-butyl benzoate, i-butyl benzoate, dimethyl phthalate, diethyl phthalate, dipropyl phthalate, di-isopropyl phthalate, di-butyl phthalate and di-isobutyl phthalate, other monoesters, diesters, succinates and diethers and the internal donors used are single or multiple.

The present invention also provides a process for the manufacture of low fine content polyolefins having high bulk density in the range of 0.30-0.45 g/cc. comprising subjecting olefins to polymerization in the presence of a catalyst system comprising said procatalyst and adding cocatalyst, optionally along with a selectivity control agent. The selectivity control agents are selected from group consisting of esters of monocarboxylic acids and their derivatives, alkoxy silanes and dialkoxy silanes. Said olefin is propylene and/or ethylene, and said polymerization is carried out in bulk, slurry or gas phase. In another embodiment, The present invention also provides a process for the manufacture of low fine content polyolefins having high bulk density in the range of 0.30-0.45 g/cc. comprising subjecting olefins to polymerization in the presence of a catalyst system comprising said procatalyst prepared from precursors of higher particle size and adding cocatalyst, optionally along with a selectivity control agent. The polyolefins prepared in this embodiment have particle size greater than 1 mm diameter and does not require an extrusion step post polymerization. The selectivity control agents are selected from group consisting of esters of monocarboxylic acids and their derivatives, alkoxy silanes and dialkoxy silanes. Said olefin is propylene and/or ethylene, and said polymerization is carried out in bulk, slurry or gas phase.

The novelty and inventive step of the present invention resides in providing a process where the size reduction of precursor is achieved at the same time retaining its bulk density and sphericity. Size reduction of precursor particles can be achieved using smaller magnesium metal granules or by altering power consumption per unit volume or by varying both together or by varying reaction temperature. The power consumption per unit volume can be varied by altering impeller dimension, impeller type, agitator design (agitator type), agitation speed or agitator rpm and reaction mass slurry concentration. Particle size to a lower extent can also be reduced by doing fast heating in the reaction. Reduction in particle size by altering agitation speed is well known in literature with a drawback of losing control over morphology (Circularity).

The novelty and inventive step of the present invention also resides in providing a precursor and the procatalyst thereof for polymerization of olefins, which results in an extruder less reactor granule technology i.e. polymers are obtained without extrusion, thereby reducing the steps of polymerization. The polymer obtained has a particle size greater than 1 mm diameter.

The magnesium alkoxide particles (precursors), the Ziegler-Natta procatalysts and the polyolefin resin in the following examples have been characterised by various methods. The alkoxy content of the alkoxide particles are measured by gas chromatography of the solution made by hydrolyzing magnesium alkoxide in dilute mineral acid. The mean particle size and span is obtained by particle size analyzer using laser and optical diffraction method on CILAS 1180 particle size analyzer. Span is calculated by ratio of $(D_{90}-D_{10})/D_{50}$ where if $D_n$=X microns then it signifies that n % of the total particle population is below X microns. Bulk density is measured by measuring the tapped volume and weight of certain quantity of powder and by dividing weight of the powder by the tapped volume. The circularity is measured from the analysis of scanning electron microscope image using image analysis software. Circularity of a particle is =(area of 2 dimensional particle image)/(area of circle having same parameter as the particle). Donor content is determined using high pressure liquid chromatography of the catalyst solution in methanol. Polymer bulk density is calculated by measuring tapped volume and weight of fixed polymer resin quantity and then dividing weight by volume. For comparing the polymer flow time the polymer is passed through a slit of 5 mm width and time taken to flow 100 gm of sample is measured. The rubber phase distribution in the polymer is measured by FTIR instrument. FTIR analysis was performed on Perkin-Elmar spectrum GX instrument.

Once spherical particles of precursor are formed they should retain their shape and size provided they can bear the attrition in the process. In our invention we are making particles of defined size at which the shape and size retention is much better.

The invention is further illustrated by way of the following non-limiting examples. Variations and modifications are possible from the examples without departing from the scope and spirit of the invention.

EXAMPLES

Preparation of Precursor

Example 1

Synthesis of Attrition Resistant Precursor by Using Low Particle Size Magnesium

Magnesium powder (5.5 kg) having mean particle size of 125 micron was added to mixture of ethanol and methanol (125 L) in presence of initiator iodine (150 gm) at 40° C. with continued stirring. The agitator rpm was kept at 350 and it is corresponding to a power consumption of 0.86 KW/m³. Making use of reaction exothermicity and external temperature control, reaction was conducted in a step-wise manner, heating first in the range to 40° C. to 60° C. for a period of 1 hrs and then in the range of 60° C. to 80° C. for a period of 2 hour, further by maintaining reaction temperature at 80° C. for a period of 7 hours. The vapours of the mixture produced during the reaction were condensed in an overhead condenser. The hydrogen gas produced during the reaction was vented off and the mixture of alcohols left after the reaction was removed by filtration. The filtrate was reused for the synthesis. A wet cake was obtained after removal of the filtrate. The wet cake was dried to obtain 25 kg of white free flowing spheroidal particles having a bulk density of 0.55-0.60 g/cc and surface area of 10 m²/g. SEM image is provided in FIG. 1.

Example 2

Comparative Synthesis of Precursor

Magnesium powder (5.5 kg) having mean particle size of 250 microns was added to mixture of ethanol and methanol (125 L) in presence of initiator iodine (150 μm) at 40° C. with continued stirring. The agitator rpm was kept at 350 and it is corresponding to a power consumption of 0.86 KW/m³. Making use of reaction exothermicity and external temperature control, reaction was conducted in a step-wise manner, heating first in the range to 40° C. to 60° C. for a period of 1 hrs and then in the range of 60° C. to 80° C. for a period of 2 hour, further by maintaining reaction temperature at 80° C. for a period of 7 hours. The vapours of the mixture produced during the reaction were condensed in an overhead condenser. The hydrogen gas produced during the reaction was vented off and the mixture of alcohols left after the reaction was removed by filtration. The filtrate was reused for the synthesis. A wet cake was obtained after removal of the filtrate. The wet cake was dried to obtain 25 kg of white free flowing spheroidal particles having a bulk density of 0.50-0.55 g/cc and surface area of 10 m²/g. SEM image is provided in FIG. 2

Example 3

Synthesis of Attrition Resistant Precursor by Inducing High Shear in the Reaction Mass Through Higher Power Input to the System Magnesium powder (5.5 kg) having mean particle size of 250 micron was added to mixture of ethanol and methanol (125 L) in presence of initiator iodine (150 μm) at 40° C. with continued stirring. The agitator rpm was kept at 600 and it is corresponding to a power consumption of 4.2 KW/m³. As the power consumption increases the shear in the reaction mass will also increase which causes reduction in precursor particle size. Making use of reaction exothermicity and external temperature control, reaction was conducted in a step-wise manner, heating first in the range to 40° C. to 60° C. for a period of 1 hrs and then in the range of 60° C. to 80° C. for a period of 2 hour, further by maintaining reaction temperature at 80° C. for a period of 7 hours. Vapours of the mixture produced during the reaction were condensed in an overhead condenser. Hydrogen gas produced during the reaction was vented off and the mixture of alcohols left after the reaction was removed by filtration. The filtrate was reused for the synthesis. A wet cake was obtained after removal of the filtrate. The wet cake was dried to obtain 25 kg of white free flowing spheroidal particles having a bulk density of 0.55-0.60 g/cc and surface area of 10 m²/g. SEM image is provided in FIG. 3.

Example 4

Precursor Particle Size Control Through Fast Heating of Reaction Mass

Magnesium powder (5.5 kg) having mean particle size of 250 micron was added to mixture of ethanol and methanol (125 L) in presence of initiator iodine (150 μm) at 40° C. with continued stirring. The agitator rpm was kept at 350 and it is corresponding to a power consumption of 0.86 KW/m³. Making use of reaction exothermicity and external temperature control, reaction was conducted in a fast heating manner, heating first in the range from 40° C. to 80° C. in 1 hrs and then maintaining reaction temperature >80° C. for a period of 8 hours. The vapors of the mixture produced during the reaction were condensed in an overhead condenser. The hydrogen gas produced during the reaction was vented off and the mixture of alcohols left after the reaction was removed by filtration. The filtrate was reused for the synthesis. A wet cake was obtained after removal of the filtrate. The wet cake was dried to obtain 25 kg of white free flowing spheroidal particles having a bulk density of 0.50-0.55 g/cc and surface area of 10 m²/g. SEM image of the same is provided in FIG. 4.

The experimental details and characteristics data of Examples 1 to 4 of precursor synthesis are given in Table 1

TABLE 1

Experimental data of precursor synthesis

| Example No | Mg Size (μm) | Agitator rpm | Power consumption (KW/m³) | Temperature after 1 hr | Temperature after 3 hr | Product properties-Mg (% wt) | Precursor size (μm) | Span | Circularity |
|---|---|---|---|---|---|---|---|---|---|
| 1 | 250 | 350 | 0.86 | 50 | 80 | 21.8 | 35 | 1.1 | 0.85 |
| 2 | 125 | 350 | 0.86 | 50 | 80 | 21.7 | 24 | 0.9 | 0.92 |
| 3 | 250 | 600 | 4.2 | 50 | 80 | 21.6 | 24 | 0.9 | 0.92 |
| 4 | 125 | 350 | 0.86 | 80 | 80 | 21.9 | 30 | 1.0 | 0.85 |

In Examples 2 and 3 the improved precursor having desired particle size and circularity is made. When these are used in procatalyst synthesis and compared with the normal precursor (Example 1) then retention of particle shape and size is much better as given in data below.

Example 5

Experiment to Determine the Impact of Power Consumption Per Unit Volume of Reaction Mass (Indirect Measurement of Shear in the Reaction Mass)

Various similar experiments conducted at different scale of precursor synthesis batch size of 25-250 Kg to find out the agitation parameter which controls the PSD of precursor. The plot showing the correlation between mean particle size and power consumption per unit volume is shown in FIG. 5. Table-2 shows the correlation between power consumption per unit volume of reaction mass and mean particle size of precursor. Different types of impellers—propeller, straight blade turbine, pitch blade turbine and hydrofoil are used for the study. As shown in the Table 2, high particle size precursor is obtained by reducing the power output of agitator to <0.4 KW/m³. Higher particle size magnesium of 250 micron is used in these experiments; however different combinations of magnesium particle size, agitator power, catalyst quantity and temperature profile can be used to make precursors of high particle size.

TABLE 2

Experimental data of power consumption correlation

| KW/m3 | Mean size (micron) |
|---|---|
| 0.85 | 35 |
| 4.20 | 22 |
| 0.36 | 65 |
| 0.38 | 59 |
| 0.22 | 70 |
| 1.00 | 45 |

Procatalyst Preparation

Example c.1

Z-N Procatalyst Preparation Using Example 1

The magnesium alkoxide (50 kg) from Example 1 was treated with a equal volume mixture of 1150 liters TiCl$_4$ and chlorobenzene in three step treatment at 100° C. Internal donor Diisobutyl phthalate (DIBP) is added in first step. Benzoyl Chloride is added in the last step. After three stage treatment solid procatalyst is filtered and given four washes with 1000 liters isopentane each and then it is dried at 50° C. under stream of nitrogen. 55 kg of brown colored procatalyst was obtained. SEM image of the same is provided in FIG. 6.

Example c.2

Z-N Procatalyst preparation using Example 2

The magnesium alkoxide (50 kg) from Example 2 was treated with a equal volume mixture of 1150 liters TiCl$_4$ and chlorobenzene in three step treatment at 100° C. Internal donor Diisobutyl phthalate (DIBP) is added in first step. Benzoyl Chloride is added in the last step. After three-stage treatment solid procatalyst is filtered and given four washes with 1000 liters isopentane each and then it is dried at 50° C. under stream of nitrogen. 55 kg of brown colored procatalyst was obtained. SEM image of the same is provided in FIG. 7.

Example c.3

Synthesis of Ziegler Natta Procatalyst Using Magnesium Alkoxide

The magnesium alkoxide (10 gm) of average size 65 μm is treated with equal volume mixture of 230 ml TiCl$_4$ and chlorobenzene in three step treatment at 110° C. Reaction is initiated between 15° C. to 30° C., internal donor Diisobutyl Phthalate is added in first step. After each step solid liquid separation is done through decantation. Benzoyl Chloride is added in the last step. After three stage treatment, solid procatalyst is decanted and given four washes with 200 ml n-hexane each and then it is dried at 50° C. under stream of nitrogen. 11 gm of yellow colored catalyst is obtained.

Example c.4

Synthesis of Ziegler Natta Procatalyst Using Magnesium Alkoxide

The magnesium alkoxide (10 gm) of average size 65 μm is treated with equal volume mixture of 230 ml $TiCl_4$ and chlorobenzene in three step treatment at 110° C. Reaction is initiated between 15° C. to 30° C., internal donor Diisobutyl Phthalate is added in first step. After each step solid liquid separation is done through in situ filtration. Benzoyl Chloride is added in the last step. After three stage treatment, solid procatalyst is filtered and given four washes with 200 ml n-hexane each and then it is dried at 50° C. under stream of nitrogen. 11 gm of yellow colored catalyst is obtained. SEM image of the same is provided in FIG. 8.

The experimental details of procatalyst synthesis are given in Tables 3 and 4

TABLE 3

Experimental data for procatalyst synthesis

| | | | | Product properties | | | | |
|---|---|---|---|---|---|---|---|---|
| Example No | Precursor used | Precursor size (μm) | Ti (% wt) | Surface area (cm²/g) | Donor (% wt) | Catalyst mean size (μm) | Span | Circularity |
| c.1 | Example 1 | 35 | 3.1 | 242 | 11 | 29 | 1.4 | 0.7 |
| c.2 | Example 2 | 24 | 3.0 | 295 | 11 | 23 | 1.2 | 0.8 |

As shown above higher mechanical strength is proved by lower breakage of the particles. Morphology is depicted through the SEM images of the particles.

Span and mean particle size is already given. BD is provided. Attrition resistance of the catalyst is proved through fines content. Lower fines in resin indicate higher resistance to the attrition. Data is given below.

Said catalyst is better because breakage from precursor to procatalyst is almost negligible (ratio of precursor average size to procatalyst average size is ~1.0), and circularity is also closer to that of precursor.

TABLE 4

Experimental data for Ziegler Natta procatalyst synthesized by using magnesium alkoxide precursors

| Catalyst prepared by | Ti (wt %) | Mg (wt %) | Donor (wt %) | Mean particle size (μm) | Span |
|---|---|---|---|---|---|
| Example c.3 | 3.3 | 17.9 | 10.1 | 67 | 1.07 |
| Example c.4 | 3.4 | 18.2 | 10.7 | 70 | 0.97 |

It can be seen in table 4 that catalyst with mean particle size in the range of 65-70 μm is synthesized with very narrow distribution as reflected in span values.

Polymerization Using Procatalyst

Example p.1

Gas Phase Polymerization Using Procatalyst of Example c.1

Procatalyst of Example c.1 is used in a continuous fluidized polymerization reactor to prepare polypropylene having a polymer production capacity of 25 Kg/hr. Triethyl aluminium is used as cocatalyst and a diester donor is used as selectivity control agent. Reactor pressure kept at 30 Kg/cm². Reactor temperature was kept at 70° C. SEM image of the same is provided in FIG. 9. The mole ratios Aluminum:Ti is kept at 75 and Aluminum:Donor kept at 1.8.

Example p. 2

Gas Phase Polymerization Using Procatalyst of Example c.2

Procatalyst of Example c.2 is used in a continuous fluidized polymerization reactor to prepare polypropylene having a polymer production capacity of 25 Kg/hr. Triethyl aluminium is used as cocatalyst and a diester donor is used as selectivity control agent. Reactor pressure kept at 30 Kg/cm². Reactor temperature was kept at 70° C. In comparison with Example p. 1 improved catalyst activity, polymer bulk density, improved flowability and less fines content obtained in Example p.2. Also higher rubber content incorporation is possible with catalyst of Example c.2 in comparison with catalyst of Example c.1. SEM image of the same is provided in FIG. 10. The experimental details of gas phase polymerization are given in Table. 5

TABLE 5

Experimental data of gas phase polymerization

| | | | | Resin properties | | | | |
|---|---|---|---|---|---|---|---|---|
| Example No | Catalyst used | Activity (Kg PP/gm cat) | APS(inch) | Fines (% wt) | BD (gm/cc) | Catalyst size (μm) | Flow time (sec) for 100 | Max. rubber content (% wt) |
| p.1 | c. 1 | 7.8 | 0.018 | 15 | 0.32 | 29 | 11 | 30 |
| p.2 | c. 2 | 9.0 | 0.025 | 5 | 0.40 | 23 | 9 | 48 |

Example p.3 & p.4

Polymerization of Propylene Using Procatalyst of Example c.3 & c.4

Solid catalyst (0.07 g) of example c.3 & c.4 was mixed with triethyl aluminium cocatalyst and selectivity control agent. The catalysts were mixed in such proportions that the aluminium to titanium ratio was maintained as 250:1. The mole ratio of selectivity control agent to titanium was kept at 30:1. The catalyst was employed to polymerize propylene in slurry phase with hexane as the diluent under 1 kg/cm$^2$ propylene pressure for 10 min at 20° C. initially and then under 5 kg/cm$^2$ propylene pressure for 120 min at 70° C., 50 mmol of hydrogen is added to control MFI. Polypropylene SEM image of resin obtained in Example 4 using magnesium alkoxide based catalyst of Example c.4 is shown in FIG. 11.

TABLE 6

Comparative analysis of polymer resins synthesized by using magnesium alkoxide based procatalyst

| Polymer resin prepared by | Activity Kg PP/g cat | XS % wt | MFI g/10 min | Polymer resin Avg. Particle Size (Inch) | Projected Avg. particle size at commercial scale (Inch) |
|---|---|---|---|---|---|
| Example p.3 | 9.5 ± 0.4 | 2.4 ± 0.1 | 3.5 ± 0.2 | 0.045 ± 0.002 | 0.088 |
| Example p.4 | 9.3 ± 0.4 | 2.5 ± 0.1 | 3.9 ± 0.2 | 0.044 ± 0.002 | 0.086 |

Table 6 compares the performance and properties of resin at bench scale slurry polymerization. The results indicate Magnesium Alkoxide based catalyst gives particulate resin with average particle size greater than 1 mm.

ADVANTAGES OF INVENTION

1. Reaction temperature used for precursor preparation is higher which resulted in lower batch time and hence increased productivity.
2. Precursor is used directly from the reaction mixture which helps avoiding additional step for obtaining spheroidal morphology
3. Precursor and subsequent procatalyst are used to produce high bulk density polypropylene resin.
4. Precursor particles synthesized have high activity and therefore the subsequent procatalyst produced also has high surface area catalyst.
5. Precursor and subsequent catalyst have uniform shape and narrow particle size distribution.
6. Precursor preparation process also provides with capability to vary mean particle size as per requirement.
7. Precursor and subsequent procatalyst of the present invention result for polypropylene resin with improved flowability.
8. Precursor and subsequent procatalyst of the present invention result in polypropylene resin with high rubber content incorporation.
9. Precursor and subsequent procatalyst of the present invention result in polypropylene resin with reduced fines.
10. Precursor and subsequent catalyst have higher strength for retaining its shape in further process.
11. Precursor of the present invention is capable of retaining its shape in high attrition catalyst synthesis process.
12. Supported catalyst prepared form the said precursor is capable of retaining its shape in high attrition polymerization process.
13. Precursor and subsequent procatalyst of the present invention may provide for a polymerization process which does not require extrusion.

We claim:

1. A process for the synthesis of magnesium containing attrition resistant precursor used to prepare procatalyst to produce high bulk density polymer resin comprising:
   (i) reacting magnesium metal granules with a mixture of alcohols in the presence of iodine by maintaining reaction temperature in the range of 40° C. to 90° C. for a period of 6-12 hours under agitation at a varying rate and at power consumption per unit volume from 0.1 to 30 KW/m$^3$;
   (ii) condensing vapors which are produced in step (i) in an overhead condenser and venting off the hydrogen gas; and
   (iii) separating the remaining mixture of alcohols to obtain the attrition resistant precursor.

2. The process as claimed in claim 1, wherein the magnesium metal granules have a particle size in the range of 50-1000 microns.

3. The process as claimed in claim 1, wherein the mixture of alcohols is selected from the group consisting of methanol, ethanol, propanol, isopropanol, butanol and isobutanol.

4. The process as claimed in claim 1, wherein the power consumption per unit volume is in the range of 0.1 to 10 KW/m$^3$.

5. The process as claimed in claim 4, wherein the power consumption per unit volume is in the range of 0.1 to 5 KW/m$^3$.

6. The process as claimed in claim 1, wherein the remaining mixture of alcohol is separated by decantation or filtration.

7. The process as claimed in claim 1, wherein the rate of agitation is in the range of 100 to 1000 rpm.

8. The process as claimed in claim 7, wherein the rate of agitation is in the range of 100 to 600 rpm at a power consumption per unit volume in the range of 0.1 to 5 KW/m$^3$.

9. The process as claimed in claim 1, wherein particles of the precursor have a mean particle diameter in the range of 15 to 75 microns.

10. The process as claimed in claim 1, wherein particle size of the precursor particles is controlled by:
    (i) varying magnesium metal granule size to obtain precursor particles with higher strength and bulk density of above 0.45 g/cc; and/or
    (ii) varying reaction temperature to obtain a small change in particle size; and/or
    (iii) varying power consumption per unit volume to obtain precursor particles which maintain their spherical shape.

11. The process as claimed in claim 10, wherein the particle size of the magnesium metal granules is in the range of 50-250 microns.

12. The process as claimed in claim 10, wherein the power consumption per unit volume is varied through agitation speed, reaction mass slurry concentration, or a combination thereof.

13. The process according to claim 1, wherein the size of the magnesium metal granules is 250 microns and the power consumption per unit volume is from 0.1 to less than 0.4 KW/m$^3$.

14. The process as claimed in claim 13, wherein the size of the particles of the precursor have a mean particle diameter of greater than 50 microns.

15. The process as claimed in claim 13, wherein the rate of agitation is in the range of 100 to 1000 rpm.

* * * * *